US012183191B2

(12) United States Patent
Salter et al.

(10) Patent No.: US 12,183,191 B2
(45) Date of Patent: Dec. 31, 2024

(54) VEHICLE-ENABLED OFFICER ASSISTANCE

(71) Applicant: FORD GLOBAL TECHNOLOGIES, LLC, Dearborn, MI (US)

(72) Inventors: Stuart C. Salter, White Lake, MI (US); Douglas H. Randlett, Metamora, MI (US); Christopher Charles Hunt, Livonia, MI (US); Chad Hoover, Washington, MI (US); Paul Kenneth Dellock, Northville, MI (US); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 18/078,729

(22) Filed: Dec. 9, 2022

(65) Prior Publication Data

US 2024/0194060 A1 Jun. 13, 2024

(51) Int. Cl.
*G08G 1/01* (2006.01)
*G08G 1/017* (2006.01)

(52) U.S. Cl.
CPC ........... *G08G 1/0133* (2013.01); *G08G 1/017* (2013.01)

(58) Field of Classification Search
CPC ............................. G08G 1/0133; G08G 1/017
See application file for complete search history.

(56) References Cited

U.S. PATENT DOCUMENTS

| | | | | |
|---|---|---|---|---|
| 9,950,657 | B2 | 4/2018 | Dellock et al. | |
| 10,118,593 | B2 | 11/2018 | Dellock et al. | |
| 10,692,304 | B1 | 6/2020 | Deyaf et al. | |
| 2011/0001635 | A1* | 1/2011 | Akens | G08G 1/04 340/936 |
| 2018/0025636 | A1* | 1/2018 | Boykin | G08G 1/096725 701/1 |
| 2018/0338231 | A1* | 11/2018 | Johnson | G06V 40/172 |
| 2019/0272743 | A1 | 9/2019 | Henry | |
| 2020/0168074 | A1* | 5/2020 | Lewis, Jr. | G08B 21/22 |
| 2020/0371196 | A1* | 11/2020 | Blanco | B60Q 5/005 |
| 2022/0122210 | A1 | 4/2022 | Frazier | |

FOREIGN PATENT DOCUMENTS

| | | | |
|---|---|---|---|
| CN | 109858459 | A | 6/2019 |
| CN | 114650596 | A | 6/2022 |
| DE | 102021003681 | A1 | 9/2021 |

* cited by examiner

*Primary Examiner* — Daryl C Pope
(74) *Attorney, Agent, or Firm* — Joseph Zane; Brooks Kushman P.C.

(57) ABSTRACT

An enforcement vehicle includes monitors an identified stopped vehicle using one or more sensors of the enforcement vehicle, to determine if any change to the stopped vehicle indicates a likelihood of escalation based on predefined escalation characteristics. The enforcement vehicle detects at least one escalation characteristic via the monitoring and automatically enacts a predefined vehicle reaction based on a predicted type of escalation determined from one or more detected at least one escalation characteristics.

19 Claims, 5 Drawing Sheets

VEHICLE-ENABLED OFFICER ASSISTANCE

TECHNICAL FIELD

The illustrative embodiments relate to methods and apparatuses for vehicle-enabled officer assistance.

BACKGROUND

Traffic stops and citizen interaction are everyday occurrences for enforcement entities, with millions of such encounters occurring every month. While the vast majority of these encounters proceed without incident, there is always a chance that something can go wrong when such an encounter occurs.

Discernible indicia can be discovered and quantified with regards to encounters, such as traffic stops, that result in incidents. This includes, for example, vehicles stopping but not entering park, vehicle movement following a purported stop, blinker lights remaining on, doors slightly opening, etc.

Officers, who are more focused on the exercise of completing the stop, may not notice or even be able to effectively notice (e.g., in darkness, rain, or other obscured conditions) indicators of flight or malicious intent. If the indicator occurs while the officer is approaching the vehicle, the indicator may be completely obscured from officer view by a portion of the vehicle or the current perspective of the officer. Similarly, approaching onlookers may be unnoticed by an officer focused on vehicle occupants and/or a driver.

In other instances, officers may have a K9 companion in their vehicle, but may not be in a position to release the K9 unit once an altercation or flight has begun. For example, an entangled officer may not be able to reach the vehicle, and an officer electing to release the companion instead of pursuing a subject may quickly lose track of the subject while releasing the companion.

A number of issues related to these situations may be solvable through the officer having a partner, but partners may not always be available. Further, the vision capabilities, detection capabilities, and reaction times of humans are outmatched by those available to computer-assisted systems, meaning a human may not always be able to notice or quickly react to the same indicators which a vehicle can detect and to which a vehicle can respond.

SUMMARY

In a first illustrative embodiment, an enforcement vehicle comprising one or more processors configured to determine another vehicle chosen for enforcement. The one or more processors are also configured to determine that one or more conditions for monitoring the other vehicle are satisfied and, responsive to determined that the conditions are satisfied, monitor the other vehicle using one or more sensors of the enforcement vehicle to receive data from the one or more sensors, indicating one or more measurable characteristics of the other vehicle. Further, the one or more processors are configured to analyze the received data to determine a likelihood that the other vehicle will evade, based on predefined characteristics defined as indicative of evasion compared to the measurable characteristics indicated by the received data and notify a driver of the enforcement vehicle of a determined likelihood of evasion.

In a second illustrative embodiment, an enforcement vehicle includes one or more processors configured to monitor an identified stopped vehicle using one or more sensors of the enforcement vehicle, to determine if any change to the stopped vehicle indicates a likelihood of escalation based on predefined escalation characteristics. Also, the one or more processors are configured to detect at least one escalation characteristics via the monitoring and automatically enact a predefined vehicle reaction based on a predicted type of escalation determined from one or more detected at least one escalation characteristics.

In a third illustrative embodiment, an enforcement vehicle includes one or more processors configured to receive wireless signals from one or more devices worn by an entity moving outside the enforcement vehicle. The one or more processors are also configured to determine a location of the entity based on the received wireless signals and responsive to determining the location, wirelessly transmit the location to at least one of a dispatch server or another enforcement vehicle, in wireless communication with the enforcement vehicle.

DETAILED DESCRIPTION

Figure 1:
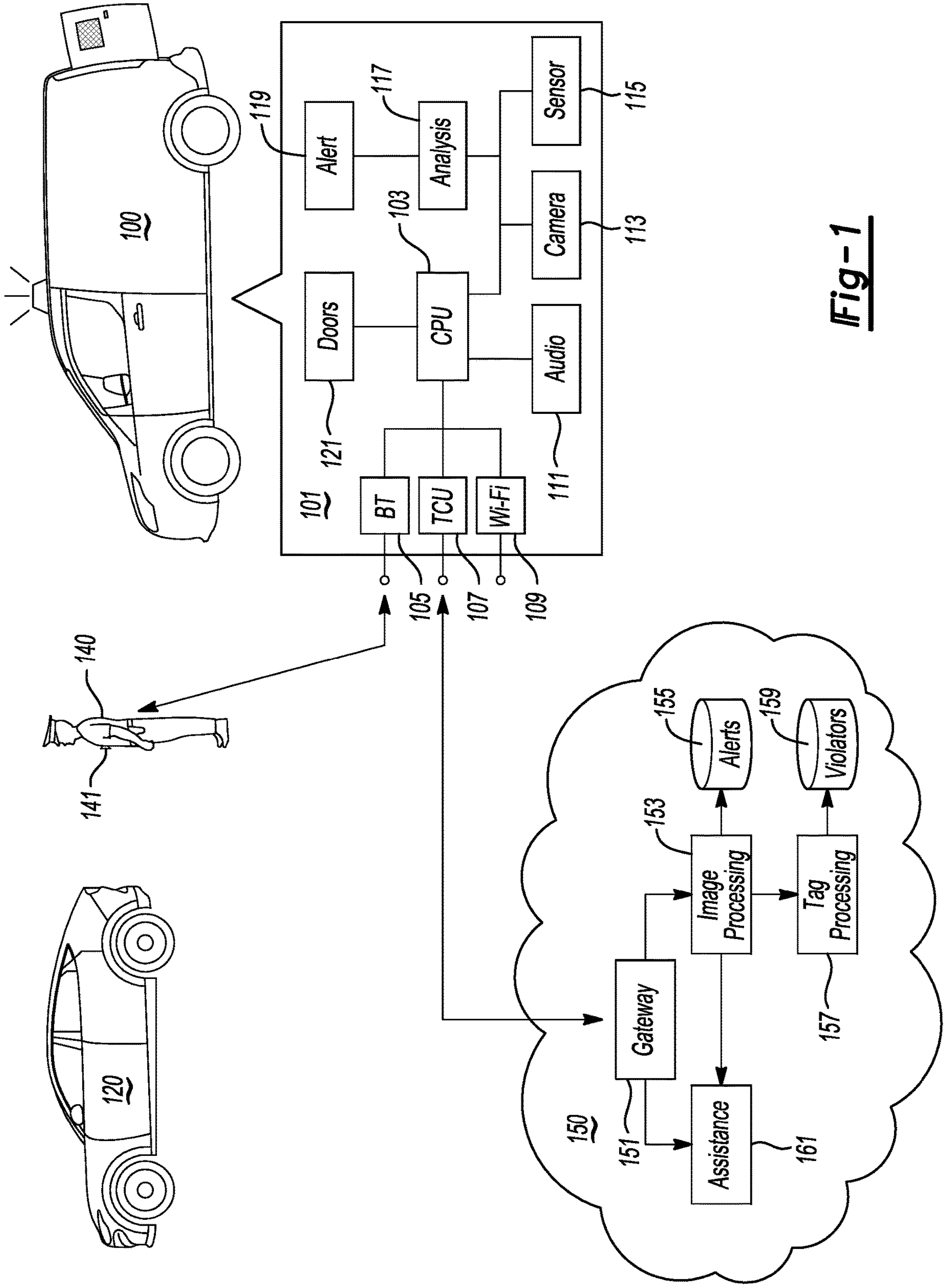
FIG. 1 shows an illustrative example of an enforcement vehicle with sensing capability.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Vehicles, including those equipped with visual (e.g. camera) and other sensors, may make excellent backup partners for officers seeking to effectuate traffic stops or other citizen encounters. Often vehicles are capable of multiple-angle vision, sensing and analysis, and even when additional humans, such as a partner, are present, the vehicle sensors may be capable of noticing and reacting to situational elements that may be overlooked or unnoticed by a human.

LIDAR and RADAR systems can detect minute movement and shifts in a scene, and cameras can provide visual analysis of a wide field of view. Active sensor analysis and sensor fusion can provide a continual evaluation of a scene or situation and may decrease the chance of escalation. Moreover, as the vehicle is present whenever a driver of the vehicle is present, the driver has at least one on-site "partner" present that can provide at least some assurances that the surroundings are being monitored and considered while an enforcement encounter is being effectuated.

FIG. 1 shows an illustrative example of an enforcement vehicle with sensing capability. In this example, vehicle 100 includes an onboard computing system 101 that has various sensing, control, communication and analysis capability, among other things. BLUETOOTH 105 or other short-range transceivers can communicate with officer 140 devices 141, such as radios, body cameras and other wireless devices. Signals can go to or from these devices, for example, activating a body camera, receiving signals from a body camera, officer GPS or microphone, and/or sending communication to an officer 140.

Wi-Fi transceivers 109 can be used for longer-range communication, both with Wi-Fi capable devices and/or broader networks connected to the Internet. Telematics control unit (TCU) 107 can be used for longer range cellular communication that can provide a connection to one or more backend systems such as the cloud 150 examples shown. Communication systems such as 105, 107 and 109 may also be used for vehicle to vehicle (V2V) communication, vehicle to infrastructure (V2I) communication or generally for V2X communication where X includes any suitable recipient entity. One or more onboard processors 103 may control the communication and other vehicle software and systems.

The vehicle may also include audio system 111, which in this example may include significant external audio (e.g., a loudspeaker) capable of broadcasting instructions and alerts to a long distance. This can allow the vehicle 100 to issue automated instructions and provide audible response to indicators of a situation, such as announcing an instruction to a vehicle occupant or bystander and/or alerting the officer of any detected abnormal situation or indicator.

One or more sensors, such as vehicle camera(s) 113, and other sensors 115 (e.g., LIDAR, RADAR, etc.) may continually evaluate a scene both pre and post stop, and analysis 117 of the data from these sensors, including fused sensor data, may provide continual insight into any developing situations. The analysis can be performed onboard the vehicle 100 and/or in the cloud 150 as is suitable for a given situation. For example, the cloud may provide detailed analysis of recorded data such as license plate or facial data, having the databases suitable for comparison, and the vehicle 100 may provide analysis of live sensor feeds to determine, for example, if indicators indicating potential flight or engagement are present. An alert process can both trigger the external audio system 111 when desired and/or broadcast more subtle messages to the officer. The alert process may also send messages to other local enforcement vehicles and/or the backend so that backup can be dispatched with reasonable efficiency in response to a developing situation revealed through sensor data analysis.

The system may also have one or more unlockable and openable doors 121, which can provide the capability for the vehicle to unlock and/or open doors at suitable moments, such as when an officer approaches with a detainee and/or when a K9 unit should be released to provide assistance.

At some point during effectuation of a stop of vehicle 120, for example, the vehicle 100 may record license plate data of the vehicle 120 and pass the data to the cloud 150 through a gateway process 151, responsible for routing incoming and outgoing communication. This communication can also include video of the vehicle 120, for example, to be compared to behavior identified in data sets stored in database 155. Such data can allow an AI process 153 to evaluate behavior shown in the video data to determine any threshold correlation to evasive or aggressive behavior.

In this example, image analysis can also include tag processing 157, wherein the vehicle license plates can be compared to a database of license plates associated with threats and violators, to quickly alert the officer 140 if the license plates indicate an elevated chance of negative encounter, if the vehicle is subject to prior violations, has been reported stolen, etc. Certain of the analysis processes may initiate an assistance request at 161, which can go to a dispatcher or other units proximate to unit 140 to render assistance.

Signals to the cloud can include live video, including body-cam and dashboard cam feeds, as well as live audio, and analysis can be performed on all live feeds. Thus, if the data reveals a situation requiring assistance (e.g., a struggle) and/or the issuance of a verbal request for assistance (e.g., "help") the process can quickly and responsively act by sending assistance through process 161. In other instances, assistance may be queued—e.g., a license plate reveals a repeat offender may be present and one or more additional units may be placed on alert, or instructed to head towards the scene, but may be called off if the stop is effectuated without incident.

Figure 2B:
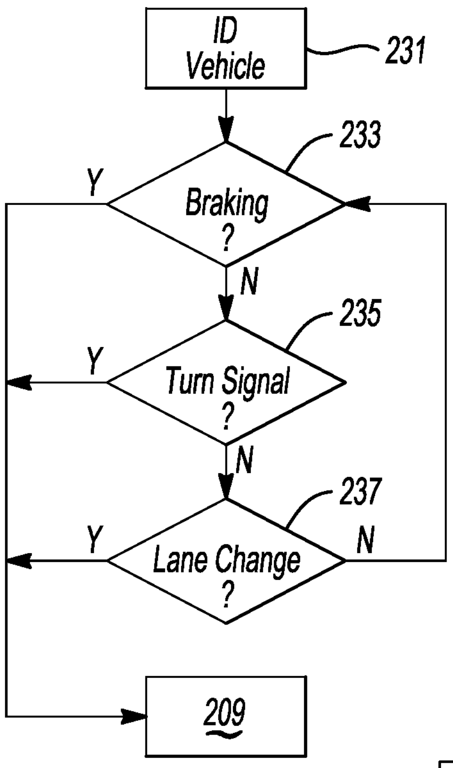
FIG. 2B shows an illustrative reaction analysis process.
Figure 2A:
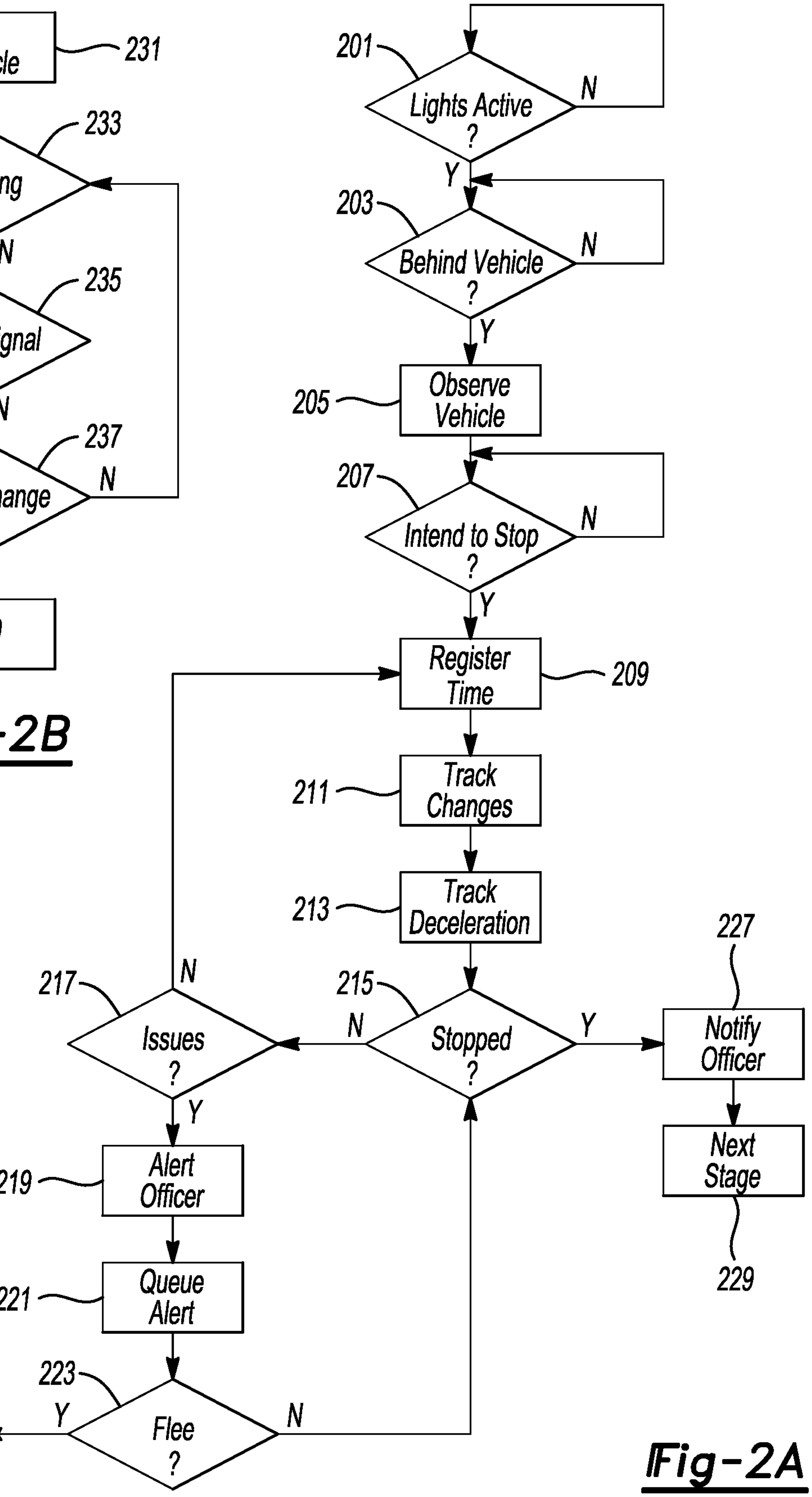
FIG. 2A shows an illustrative pre-stop analysis process.

FIG. 2A shows an illustrative pre-stop analysis process. In this example, an enforcement intent indicator is detected at 201, such as lights being active in this example. Lights, in this content, means emergency alert lights (e.g., the lights atop a police vehicle). Other indicators could include an officer pressing a button, activation of a siren, etc. Further, upon activation, the process may either automatically begin tracking the noted elements or wait for further indication that a stop is being effectuated, as the officer may also be heading to an emergency and thus have activated the lights to speed transportation.

In some examples, it may be possible to proceed with the noted analysis and simply discard any data when a stop is not actually being effectuated. If the approach of "automatically analyze" is being taken, it may be worthwhile to provide some form of confirmation with the officer before sending any sort of alert offboard—i.e., to prevent inadvertent analysis and alert of a preceding vehicle as attempting to flee when the officer is not even attempting to stop the preceding vehicle.

When a stop is being effectuated, the process may determine at 203 when the enforcement vehicle 100 is behind an object vehicle 120 that is being stopped. This may require some identification from an onboard officer and/or may require the enforcement vehicle knowing a characteristic of the vehicle being stopped, such as a license plate, so that the enforcement vehicle 100 can automatically identify the object vehicle from a camera feed.

In this example, it is assumed that the driver of the object vehicle may not know they are the subject of a stop until the enforcement vehicle 100 is behind them, so being behind the object vehicle 120 is a predicate of the data analysis in this example, but any suitable predicates may be used. That said, it may be useful to analyze data when it is clear that a certain vehicle has been identified (so the enforcement vehicle knows which vehicle to observe) and when it is reasonable to assume that the certain vehicle's driver also knows or should know that they are the subject of a stop request.

When any predicated for observation and analysis have been satisfied, the process can begin to observe and analyze the behavior of the object vehicle through gathered sensor data. For example, the enforcement vehicle 100 can observe the vehicle 120 at 205 and based on gathered data, determine if the observed vehicle 120 is evincing an intent to stop at 207.

FIG. 2B shows an illustrative reaction analysis process. This is an example of what factors may be considered evidence of an intent to stop. In this example, the process identifies the vehicle 100 based on a license plate or other marker. This information can be sent to the cloud for further analysis, and the cloud (or an onboard database) may also return a targeted training set of data (for AI analysis) that more closely matches vehicles of the exact or similar type to the target vehicle 120. That may aid in analyzing what constitutes an intent to stop for a vehicle of a given make and/or model.

In this example, some generic (i.e., identifiable for virtually any vehicle) considerations are shown, which may be broadly applicable in determining an intent to stop. This includes, for example, activation of brake lights at 233 indicating braking, which may additionally include slowing below a speed limit, to distinguish this from other braking without any clear intent to stop.

This can also include activation of turn signals at 235, which then may be followed by lane changes in the indicated direction at 237. Lane changes without turn signals, as long as the vehicle changing lanes is headed towards a shoulder of a road, may also be indicative of an intent to stop, especially if combined with braking below a speed limit. Intent to stop analysis can also contemplate the context of the environment—for example, in heavy rain, the evaluation may wait until one or more covered locations (e.g., under a bridge) have been passed before determining no intent to stop, or in heavy traffic, the evaluation may wait until several gaps permitting lane changes have occurred, without any actual lane changes by the target vehicle, before concluding no intent to stop. Because it may not be reasonable to simply expect the target vehicle to come to an immediate halt, the analysis process may be rendered capable of considering context as well. This can also include obstructions on the shoulder, speeds of proximate traffic, density of traffic, etc.

In this example, intent to stop is simply an indicator of likely flight and/or willingness to comply with an officer, so the officer can also personally take content into consideration when evaluating any indicators of possible non-cooperation. The vehicle 100 records the time at 209 for a target vehicle 120 to evince some intent to stop, as defined for the particular analysis, and the time may be a factor to consider when determining the likelihood of flight. On the other hand, it may simply indicate a driver who was not focused, so this variable may be considered in conjunction with other factors as well, as opposed to simply being a lone indicator.

The process can also track changes in the vehicle 120 behavior at 211 once it is clear the vehicle 120 is aware of the enforcement request (by demonstrating some intent to stop), which can include lane movement, turn signal usage, velocity changes, etc. Movement consistent with a reasonable attempt to stop the vehicle 120 may be viewed more favorably as cooperation than movement that has been previously observed by people who ultimately fled. This tracking can continue until the vehicle is stopped at 215.

If, during the tracking, the aggregated analysis indicates a possible flight at 217, further action can be taken. The analysis may determine, for example, that the vehicle 120 took an unreasonable (by average standards) amount of time to respond to the enforcement request and was evincing behavior potentially indicative of flight. This may cause the enforcement vehicle to notify the officer at 219, that the variable factors are leaning towards possible flight, which may cause the officer to close any gap with the target vehicle to discourage flight. Alerts may be prepared and queued as well at 221, so that if flight is attempted at 223, the requests for assistance are immediately ready to be sent at 225. In this example, no such request is sent until flight (e.g., rapid lane changing and evasion, including possibly rapid velocity increase) is observed by the enforcement vehicle.

On the other hand, once the target vehicle 120 stops at 215, the process notifies the officer that the vehicle has been detected as having stopped (e.g., ceased movement fully) and the process can proceed to a post-stop analysis process.

Figure 3:
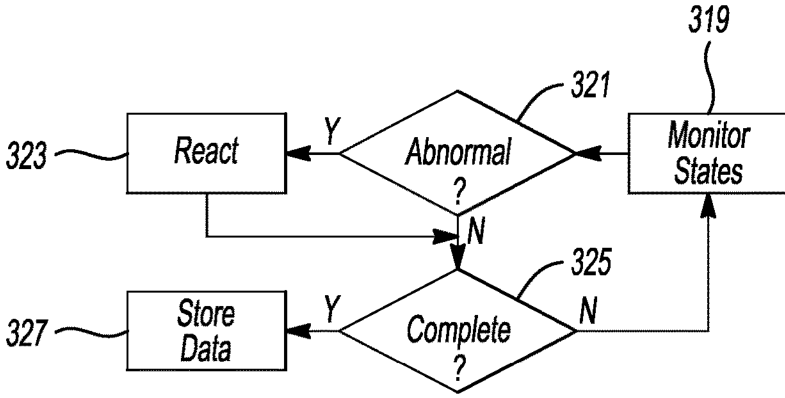
FIG. 3 shows an illustrative post-stop analysis process.
Figure 3:
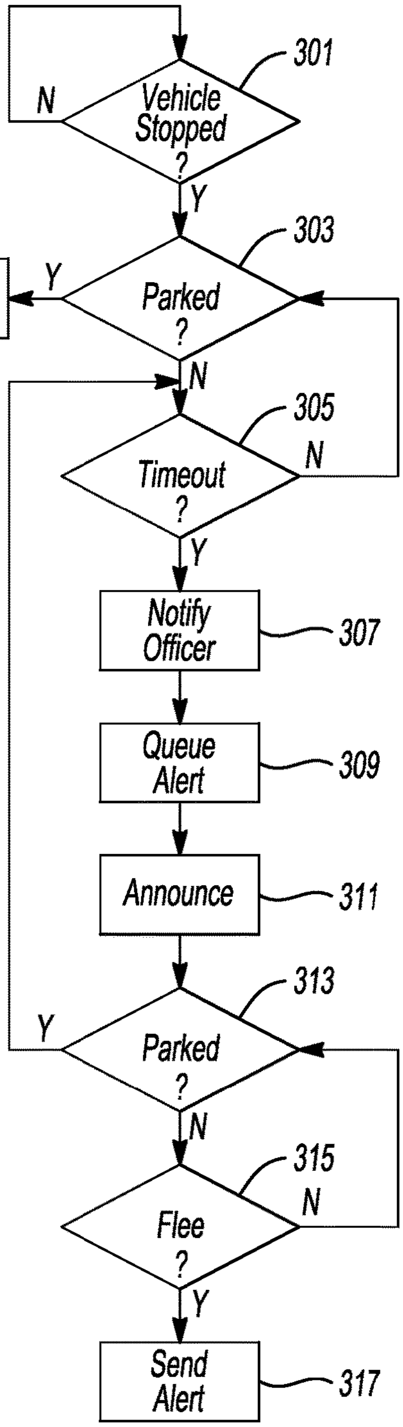

FIG. 3 shows an illustrative post-stop analysis process. In this example, the vehicle, either autonomously and/or based on occupant (e.g., officer) indication, determines that the object/target vehicle 120 has stopped moving at 301. Even when a vehicle stops moving, this does not necessarily indicate cooperation, and this illustrative process is capable of determining when there is a likelihood that a stop is a "false stop" and that the object vehicle's driver intends to elude.

One indicator of possible intent is when the vehicle 120 is stopped but brake lights remain active at 303. That is, if the vehicle is stopped and parked, there is no need for braking, as the engine is not engaged. Accordingly, a vehicle 120 may be considered parked at 303 when it is both stopped and no brake lights are visible.

In order to give the occupant some time to park the vehicle at 303, the process in this example also includes a timeout at 305, which may be tuned to a reasonable amount of time for a vehicle to become parked after a stop. Once the vehicle is stopped, but not parked, and the timeout has elapsed, the process may assume that there is at least the possibility of non-cooperation. Moreover, in most jurisdictions, the driver is expected to power down a vehicle upon a stop, and so the enforcement vehicle can look for other signs of non-cooperation, such as exhaust continuing, active turn signals, slight forward movement, etc. Sensors of the enforcement vehicle may be far more capable of observing these slight signals than a human, such as an IR sensor observing exhaust clouds exiting an exhaust pipe at night, or radar detecting slight creeping forward of the object vehicle.

The enforcement vehicle can notify the officer of any signals detected at 307, and the officer can make the eventual evaluation about non-cooperation if desired. At the same time, the vehicle 100 can queue up an alert at 309 and can, if desired, issue an automated external announcement asking the object vehicle to cease the behavior identified as anomalous—e.g., "please place the vehicle in park and turn off the engine" or "please cease moving forward." In this manner, the announcement can include a cessation instruction correlated to detected behavior or characteristics that should and can be stopped. If the driver of the object vehicle intends to flee, or is debating whether to flee, such an announcement may elicit either cooperation (cessation of requested activity) or flight, and in the latter case the officer has not yet left the vehicle 100 (rendering pursuit easier) and the alert is queued for transmission to request assistance.

If the vehicle parks or otherwise complies at 313, the process can branch to 319, but otherwise the process can continue monitoring cooperation until the vehicle either flees at 315 or complies at 313. If the vehicle flees at 313, the process can send the alert at 317 to the cloud, to dispatch or to other proximate vehicles connected through other communication medium (e.g., Wi-Fi or over a local network). Knowing the enforcement vehicle 100 can at least attempt to ensure that the object vehicle is in a state indicative of intent to comply can aid an officer in not exiting the vehicle 100 until such a state is present in the object vehicle 120, which increases the likelihood of successful pursuit and/or diminishes the likelihood of flight.

While the object vehicle remains in a cooperative state and as the officer exists the enforcement vehicle 100 and approaches the object vehicle 120, the enforcement vehicle 100 can continue to monitor at 319 the object vehicle 120 and the surrounding environment for abnormalities. If something classified as abnormal occurs at 321—e.g., without limitation, the object vehicle moves, a door begins to open, an engine is engaged, a bystander approaches, etc. the enforcement vehicle 100 can react at 323. Examples of abnormalities and reactions are discussed in greater detail with respect to FIGS. 4A-4C, in non-limiting illustrations.

Otherwise, eventually the stop will be complete at 325 and the officer will return to the enforcement vehicle. Determining the stop is complete can include the input of certain data by the officer, an express indication that the stop is complete, movement of the enforcement vehicle, placement of a detainee in the enforcement vehicle, etc. Any recorded and observed data can be stored with respect to an accessible record at 327 and uploaded to the cloud for storage, so that the data related to the incident can be used for further analysis and if needed for evidentiary purposes.

Figure 4A:
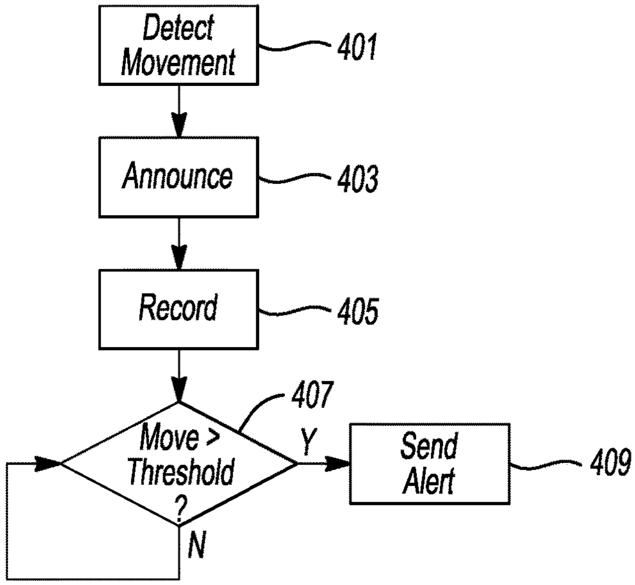
FIGS. 4A-4C show illustrative situational reaction processes.
Figure 4B:
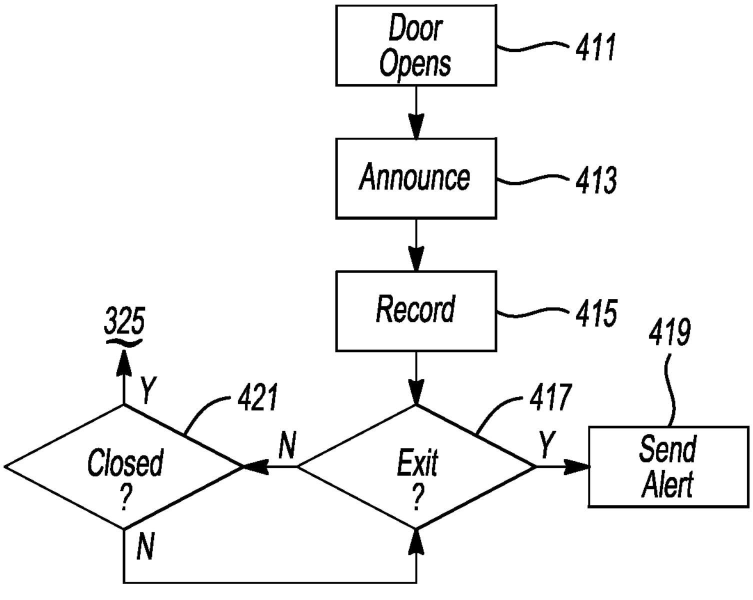
Figure 4C:
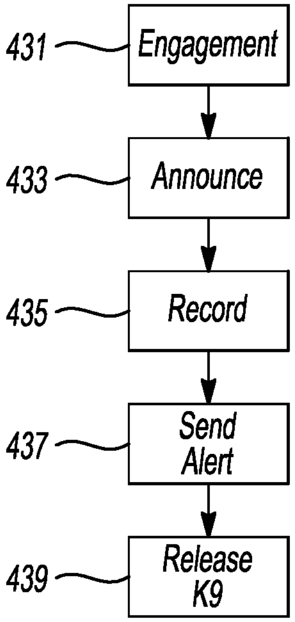

FIGS. 4A-4C show illustrative situational reaction processes. In these examples, the enforcement vehicle observes various illustrative, non-limiting abnormalities and enacts an illustrative, non-limiting response. These are merely a few examples of what the vehicle may observe and to what the vehicle may react, but they can provide an understanding of how the enforcement vehicle can be tuned to recognize certain behavior identified as associated with an intent to engage or flee, and how the vehicle 100 can be configured to react to such instances.

For example, if the object vehicle 120 suddenly increases velocity, the officer may have to use a radio to report the flight, and the officer or someone else may have to coordinate the location of the fleeing vehicle, vehicle identification, the fact of flight, etc. On the other hand, the enforcement vehicle can detect slight movement at 401 and immediately react. If the slight movement quickly changes to flight, the enforcement vehicle can immediately distributed a data packet including vehicle identifier of the object vehicle, location of the enforcement vehicle and fact of flight near instantaneously and to dozens of vehicles. Working in conjunction with the backend, this data can be nearly immediately delivered to any proximate undispatched vehicles along a likely flight path and chances of both apprehension and termination of flight can be increased.

Even if the vehicle 120 does not immediately increase velocity away from the stop, the vehicle 100 can announce a request to cease movement at 403, which can alert the driver that the flight attempt, if that was the reason for the movement, was detected. On the other hand, the driver may simply be pulling to a better location on the shoulder, and so the driver can complete the manuver if flight is not intended. The process can record the detected movement and any driver responses at 405, and, for example, if the vehicle 120 moves more than a threshold amount at 407, or at more than a threshold speed, or more than a threshold amount in a given direction (e.g., towards a road), the enforcement vehicle 100 may issue an alert at 407.

The alert may also be pre-emptive in nature, such as "vehicle N at location X,Y is exhibiting evasive tendencies, please be prepared for possible evasion." Then, if vehicle N actually attempts to evade, one or more other patrol vehicles are on alert. If the evasion never occurs, a follow up message can be issued, such as "vehicle N has resumed cooperation and ceased evasive tendencies." Depending on the granularity of what is or is not considered an evasive tendency, the pre-emptive alerts may or may not be issued—e.g., issuance may be tuned to prevent inundation with false positives.

In FIG. 4B. the process considers whether a door of the vehicle was opened in the absence of officer instruction at 411. This can include, for example, the door opening before the officer has ever exited his or her own vehicle, or while an officer is approaching or is at the object vehicle 120. Audio analysis can reveal if an exit instruction was issued by the officer, as well as affirmative input of data indicating exitance instructions.

The vehicle 100 can issue an audible alert to the occupants of the object vehicle at 413, such as "please do not open vehicle doors or exit the vehicle unless instructed by the officer." Additionally, this instruction could be repeated in multiple languages to ensure comprehension. The officer would hear the instruction, and could terminate any further instruction or alerts if exitance was instructed. The vehicle 100 can also record the data leading to the instruction and subsequent cooperation or refusal to cooperate.

In this example, if the door continues to open and the officer has not terminated the instruction at 417—and someone actually exits the vehicle, the process can send a request for assistance at 419. This can also help the officer remain focused on those remaining in the vehicle—so that if someone flees, the officer can know that the vehicle 100 has noted the flight and sent an alert and the officer can stay focused on the vehicle 120. On the other hand, if the door recloses at 421, the alert state can terminate and monitoring can resume.

It is worth noting that certain instances may result in a direct message to the officer as opposed to an audio alert, and this may be one of those instances. It may not always be possible to discern audible officer instructions, and in order not to controvert a direct instruction, the vehicle 100 may instead issue a radio signal to an earpiece or radio of the officer, informing the officer that a door is opening, including which door is opening. The officer can then take appropriate action, including ordering the door closed, seeking cover or doing nothing if the door was actually instructed to be opened.

FIG. 4C shows an example of a vehicle 100 response to officer engagement, which can include detection of a scuffle based on movement analysis, detection of a fired shot, detection of a visible weapon, etc., at 431. In this example, because engagement may represent increased likelihood of detrimental outcomes, the process may not have a termination branch if desired—that is, once engagement detected, the process will issue an alert to other officers regardless, and the on-scene officer can terminate the alert if appropriate. The vehicle 100 can send video, audio and sensor data to back up the alert, so that appropriate action can be taken by responders and to aid in minimalizing overreaction.

In this example, the vehicle 100 may again issue an instruction at 433, or may sound one or more sirens or signals designed to generally promote localized interest and render assistance to the officer if needed. The vehicle 100 may record and transmit all sensor, video and audio data at 435, so that the data can be used in determining an appropriate response. This may also include identification of the data that lead to the engagement conclusion, so a second party can consider the data, if desired, prior to committing backup resources.

The process can send the alert at 437, unless, for example, an on-scene officer terminates the alert request. Even if the alert request is terminated, the data may continue to be sent for some period of time, to prevent an officer from being forced to terminate an alert and to allow for backup to continue in such situations. Also, if necessary and if the unit is present, the process can release a K9 unit to assist the officer at 439.

Figure 5:
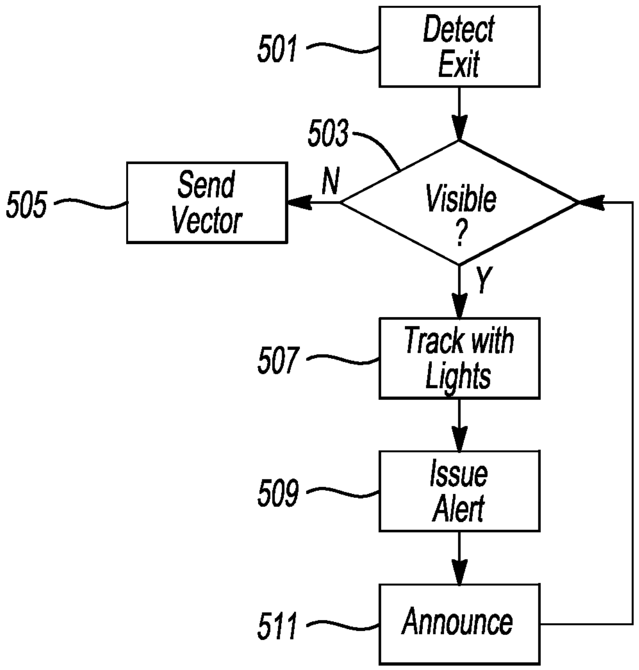
FIG. 5 shows an illustrative visual tracking process.

FIG. 5 shows an illustrative visual tracking process. In this example, an occupant has exited the vehicle 120, which can occur at any time during a stop process, including prior to an actual stop. Upon detecting the exit (discernable by sensors as an object of certain size moving away from a vehicle), the process can use certain sensor data to view and track the object at 503.

While not discussed separately, if the sensors are sensitive enough, they could also detect any objects being thrown from a vehicle and generally track the path and eventual location of those objects. This data can be flagged in the system with GPS coordinates to assist an officer with later-retrieval of the object, even if the officer cannot stop to retrieve the object at that moment. At a minimum, even if the enforcement vehicle is moving too fast to actually track the object, the moment of detecting the thrown object could be provided with a stored GPS tag to partially assist in retrieval.

While a fleeing entity is visible at 503, the process can track the entity at 507 with aimable vehicle lighting and/or sensors and issue alerts as to the tracked and updated location of the person at 509. If the enforcement vehicle is parked, it may be able to target and track a moving person for some distance before sight of the person is eventually obscured, especially through the use of laser and other sophisticated headlamps that may be highly aimable, at least in certain directions. The vehicle 100 may also announce an external cessation command instructing cessation of flight and notifying the fleeing entity that they are being tracked.

If or when the person becomes no longer visible to the vehicle due to obstruction or for other reasons, the vehicle 100 can send location data to other officers and vehicles as an alert at 505, including GPS coordinates of the vehicle, images of the location where visibility was lost, a last observed vector of the fleeing entity, etc.

Figure 6:
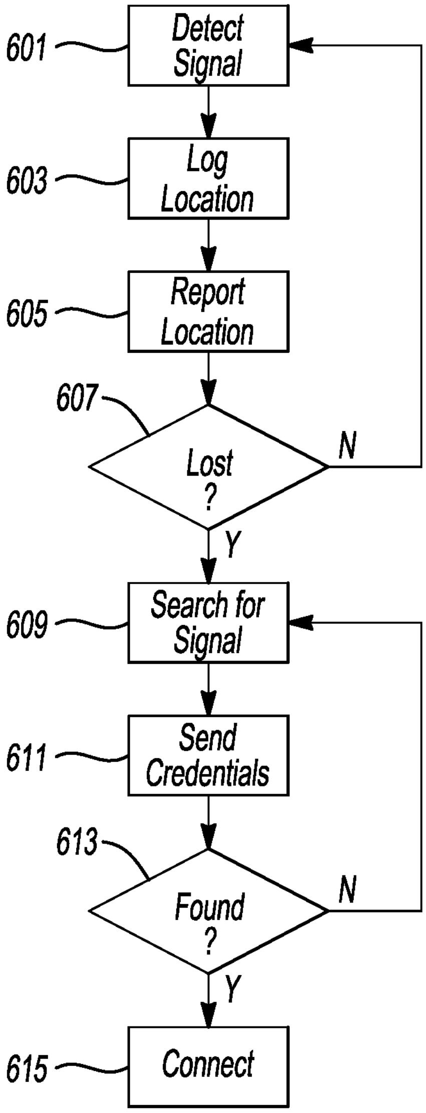
FIG. 6 shows an illustrative officer tracking and handoff process.

FIG. 6 shows an illustrative officer tracking and handoff process. If an officer elects to pursue a fleeing entity, it can be useful to track the location of an officer, knowable by signals received from officer-worn devices. This can include tracking through, for example, time of flight (ToF) for ultrawideband signals, reporting of officer coordinates from a worn-GPS, visual or sensor based detection of officer locations, etc.

If an officer is observed or reported in pursuit, the process can detect one or more wireless signals defined as usable for determining an officer location at 601. Also, as previously noted, the vehicle sensors may be able to track the officer while the officer is still visible or capable of being sensed. Signals may also be provided from, for example, a K9 unit pursuing a party and/or a drone unit pursuing a party.

Locations associated with the officer, reported from worn-GPS or determined based on signal-based location detection techniques, may be tracked at 603 and reported to other proximate officers and/or vehicles at 605. Verbal analysis can also be used to track officer location, such as an officer indicating, into a microphone, a crossroads or address—e.g., "I am at the corner of Elm and Maple" or "I am passing 1234 Maple." Body cameras may also pick up street signs or address markers and analysis of this video can be used to supplement tracking data.

If communication with one or more officer devices is lost at 607, the process may continue to search for a signal at 609 and also send communication credentials at 611 to other vehicles that may be able to establish a connection with the officer. For example, other vehicles may be dispatched for pursuit assistance and may be capable of approaching a traveling officer more closely. Once the initial vehicle loses communication, the other vehicles 100 may be provided with credentials to connect to officer devices, so that connection can be reestablished with the officer devices when one of those vehicles approaches the officer's location with sufficient proximity.

If the officer returns to range of the parent vehicle 100 at 613, the connection can be resumed at 615, or another vehicle can pick up the signal and connect based on the communication credentials, and assume the role of tracking the officer and reporting locations, handing off communication as needed as the officer moves.

Communication can also be preemptively handed off, such as if an assistance vehicle has received credentials and indicates a strong signal strength, for example. If the initial vehicle 100 is experiencing weak signal strength, it may disengage communication to allow the closer vehicle to connect to the device and monitor communication.

Through use of the illustrative embodiments and the like, vehicles can provide officer backup and assistance through a variety of scenarios, often in ways that would be impossible for even another human to provide, at least in terms of observation capability and speed of response. Since even the slightest detail or a few seconds of response time may matter, such systems can provide a useful advantage to officers in the field, even when they have a human partner present.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An enforcement vehicle comprising:

one or more processors configured to:

determine another vehicle chosen for enforcement;

determine that one or more conditions for monitoring the other vehicle are satisfied;

responsive to a determination that the conditions are satisfied, monitor the other vehicle using one or more sensors of the enforcement vehicle to receive data from the one or more sensors, indicating one or more measurable characteristics of the other vehicle;

analyze the received data to determine a likelihood that the other vehicle will evade, based on predefined characteristics defined as indicative of evasion compared to the measurable characteristics indicated by the received data; and notify a driver of the enforcement vehicle of a determined likelihood of evasion.

2. The enforcement vehicle of claim 1, wherein the one or more conditions include lights of the enforcement vehicle being activated, the enforcement vehicle being within a predefined distance of the other vehicle, and the enforcement vehicle being in a same lane as the other vehicle.

3. The enforcement vehicle of claim 1, wherein the received data indicates slowing velocity patterns of the other vehicle.

4. The enforcement vehicle of claim 3, wherein at least one predefined characteristic indicative of evasion includes slowing velocity not occurring within a predefined threshold time.

5. The enforcement vehicle of claim 1, wherein the received data indicates lane change patterns exhibited by the other vehicle during the monitoring.

6. The enforcement vehicle of claim 1, wherein at least one predefined characteristic indicative of evasion includes at least one of the other vehicle changing lanes away from a shoulder of a current road or not changing lanes towards the shoulder within a predefined threshold time.

7. The enforcement vehicle of claim 1, wherein the one or more conditions include the other vehicle having pulled over to a stopped position.

8. The enforcement vehicle of claim 7, wherein the received data indicates vehicle exterior lighting engagement of the other vehicle.

9. The enforcement vehicle of claim 8, wherein at least one predefined characteristic indicative of evasion includes illumination of brake lights more than a predefined threshold time following the other vehicle ceasing movement.

10. The enforcement vehicle of claim 8, wherein at least one predefined characteristic indicative of evasion includes illumination of a turn signal more than a predefined threshold time following the other vehicle ceasing movement.

11. An enforcement vehicle comprising:

one or more processors configured to:

monitor an identified stopped vehicle using one or more sensors of the enforcement vehicle, to determine if any change to the stopped vehicle indicates a likelihood of escalation based on predefined escalation characteristics;

detect at least one escalation characteristics via the monitoring, wherein the detected escalation characteristic includes at least one of: emission from the stopped vehicle, illumination from a taillight of the stopped vehicle, or opening of a door of the stopped vehicle; and automatically enact a predefined vehicle reaction based on a predicted type of escalation determined from one or more detected at least one escalation characteristics, the predicted types of escalation including at least one of: flight or officer engagement.

12. The enforcement vehicle of claim 11, wherein the predefined vehicle reaction includes issuance of an announcement, via an external speaker of the enforcement vehicle, including a cessation instruction correlated to at least one detected escalation characteristic.

13. The enforcement vehicle of claim 11, wherein the predefined vehicle reaction includes wireless communication with an officer, having exited the enforcement vehicle, the wireless communication indicating at least one of either the detected escalation characteristic or the predicted type of escalation.

14. The enforcement vehicle of claim 11, wherein the detected escalation characteristic includes emission from the stopped vehicle and the predicted type of escalation based on the emission includes flight.

15. The enforcement vehicle of claim 11, wherein the detected escalation characteristic includes illumination from a taillight of the stopped vehicle and the predicted type of escalation based on the illumination includes flight.

16. The enforcement vehicle of claim 11, wherein the detected escalation characteristic includes opening of a door of the stopped vehicle and the predicted type of escalation based on the opening of the door includes at least one of occupant flight or engagement.

17. The enforcement vehicle of claim 11, wherein the one or more processors are further configured to determine a likelihood of the predicted type of escalation based on at least one of a scale of the detected characteristic or a combination of detected characteristics, and wherein the predefined vehicle reaction includes alerting at least one of a dispatch or another enforcement vehicle when the likelihood of the predicted type of escalation is above a threshold.

18. The enforcement vehicle of claim 11, wherein the one or more processors are further configured to determine that an officer, having exited the enforcement vehicle, has been physically engaged by another person and responsively open a door correlated to containment of a K9 unit within the enforcement vehicle.

19. The enforcement vehicle of claim 11, wherein the one or more processors are further configured to determine that an occupant of the stopped vehicle has exited the stopped vehicle and moved more than a threshold distance from the stopped vehicle, and responsively utilize amiable lighting of the enforcement vehicle to illuminate and track the occupant while the occupant moves.

* * * * *